Oct. 31, 1933.  F. C. BIGGERT, JR  1,932,505
FLYING SHEARS
Filed July 1, 1932  2 Sheets-Sheet 1

WITNESSES
A B Wallace
J. E. Dickinson

INVENTOR
Florence C. Biggert Jr
By Brown, Critchlow & Flick
his Attorneys

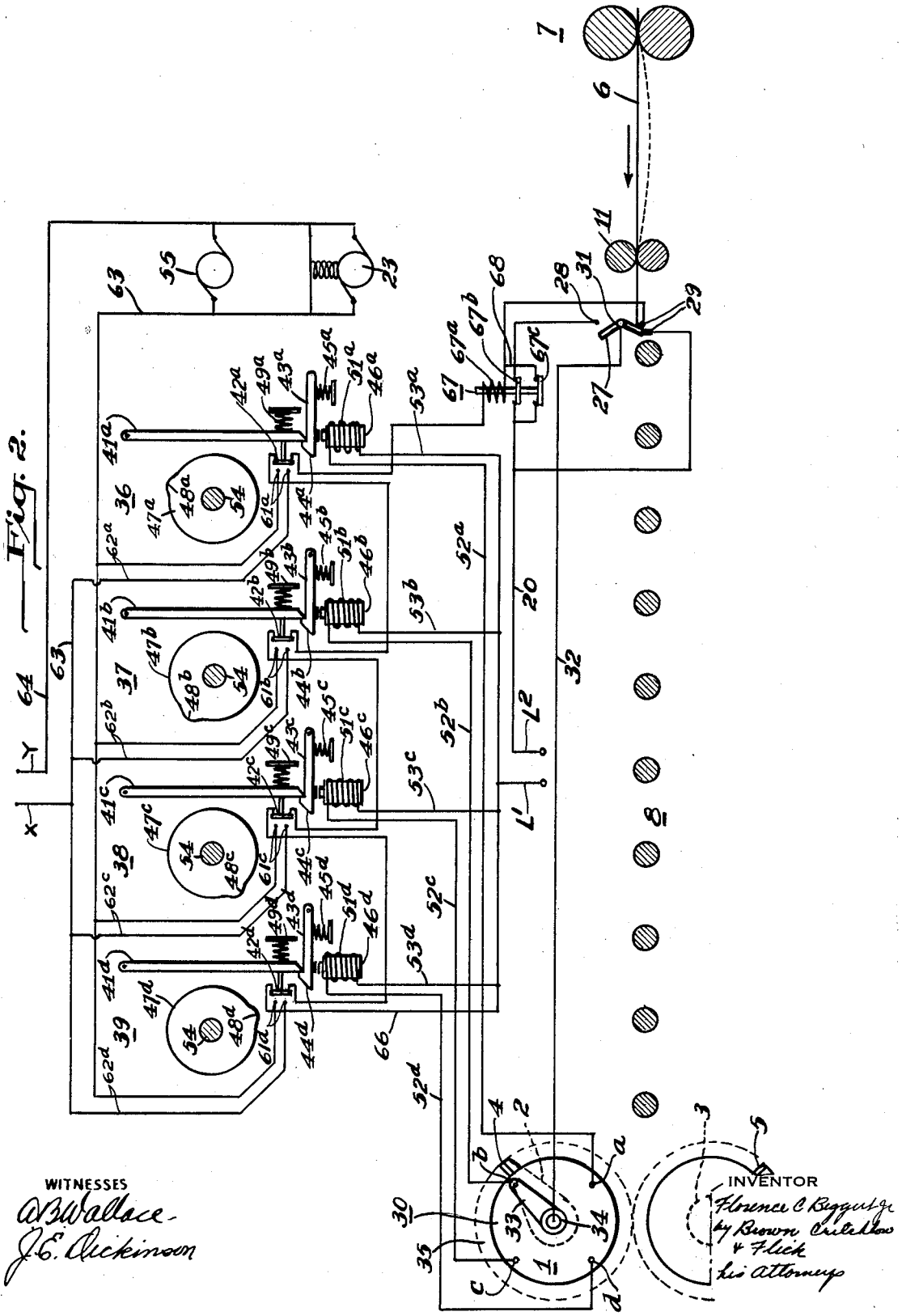

Patented Oct. 31, 1933

1,932,505

UNITED STATES PATENT OFFICE 1,932,505

FLYING SHEARS

Florence C. Biggert, Jr., Crafton, Pa., assignor to United Engineering & Foundry Company, Pittsburgh, Pa., a corporation of Pennsylvania Application July 1, 1932. Serial No. 620,318

9 Claims. (Cl. 164—68)

This invention relates to the shearing of elongate stock such as metal bars, strip and the like into sections of predetermined lengths as it is delivered to a flying shear from a rolling mill or other continuously operated feeding mechanism.

The primary object of the invention, generally stated, is to provide a shearing apparatus utilizing a continuously operated flying shear which, in addition to normally producing cuts of preselected length, is adapted to automatically determine the length of the first cut independently and without interference with the subsequent cuts, particularly for cropping purposes.

A more particular object is to provide for automatically controlling the entrance into a continuously operated flying shear of the leading end of each piece of stock which is delivered to it, and for doing so in such a way as to determine the length of the first cut without disturbing or in any way affecting the subsequent cuts.

Figure 1:
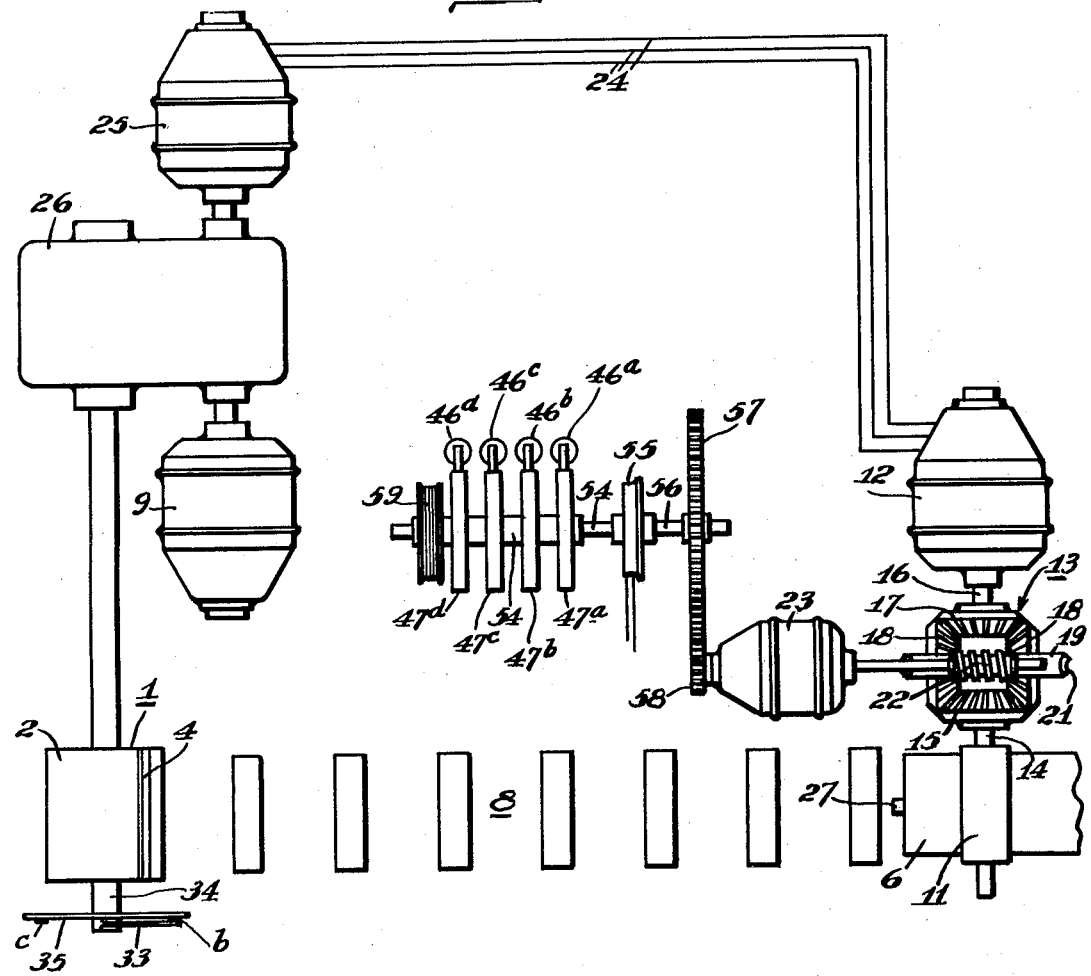
Figure 3:
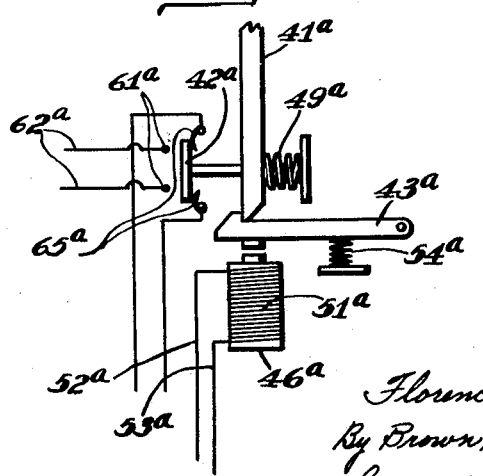

These and other objects, as well as the various other novel features and advantages of the invention will be apparent when the following detailed description is read in conjunction with the accompanying drawings, of which Fig. 1 is a schematic plan view of a shearing assembly constructed and arranged in accordance with the invention; Fig. 2 a schematic wiring diagram of a control system for controlling the operation of the mechanism utilized to regulate the entrance of the stock into the shear; and Fig. 3 a fragmentary elevational view to enlarged scale of one of the latch switches employed in the control system illustrated in Fig. 2.

Referring to the drawings, the numeral 1 designates a flying shear which may be any of a number of well known forms of flying shears, although illustrated as a rotary blade type comprising a pair of carriers 2 and 3 equipped with blades 4 and 5, respectively, which are mounted to cooperate with each other in cutting pieces of stock, such as the strip 6, into sections as it is passed through them. In accordance with the invention this shear is mounted at a sufficient distance from the means employed to deliver the strip to it such as the rolling mill 7 to allow the strip to be retarded or advanced sufficiently after it leaves the mill and before it reaches the shear to get its leading end in step with the shear blades for the first cut so as to control the length. For driving the shear a motor 9 is coupled to it and for controlling the lengths of the regular cuts produced thereby this is driven at a preselected speed which for a given speed of the mill will give the desired length of cuts, while for carrying the strip from the mill to the shear a roll table 8 or suitable mechanism may be employed.

With apparatus of this character as commonly employed in steel mills, as referred to above, the lengths of the cuts produced by the shear are customarily determined by the rotary speed of the shear blades and the linear speed at which the strip is delivered from the mill, and the first cuts are made at random which results in considerable waste.

Where stock is delivered directly from a rolling mill, as illustrated, or in the condition in which it leaves a mill, as is usually the case, a small amount of unusable material, known as crop, is present on its ends and this must be removed from the leading end in order to avoid the first regular length of cut being wasted. Furthermore, in order to reduce this waste to a minimum, it is necessary that as little good material be removed with this crop portion as is possible.

In accordance with this invention, a pair of pinch rolls 11 is mounted near the rolling mill to engage the stock as it is delivered therefrom. These in turn are adapted to regulate the movement of the stock into the shear in such a way as to time its entrance therein with the opposition of the cutting blades. For driving such rolls, they are coupled to a constant speed motor 12 which normally drives them in synchronism with the shear, and while other means may be employed for such purpose, this end is attained here by using a synchronous motor 12 and connecting it by conductors 24 to an alternating current generator 25 operably coupled to and driven by the shear motor 9. For varying the speed of the pinch rolls to regulate the entrance of the strip into the shears, a differential unit 13 is connected between them and their driving motor 12. This differential, as illustrated, although it may take other forms, comprises a pair of sun gears 15 and 17, which are connected to the pinch rolls and the pinch-roll motor 12 by shafts 14 and 16, respectively, and a plurality of intermediary planetary gears 18 which are mounted in a yoke 19. On the periphery of this yoke there is provided a worm gear 21 which is meshed with a worm 22 mounted on the drive shaft of an auxiliary motor 23 that is provided for varying the operation of the pinch roll without interfering with the operation of the pinch roll driving motor 12. Obviously with this arrangement, when the yoke motor 23 is at rest or deenergized, the yoke is maintained in a fixed position and the speed of the pinch rolls is determined solely by the speed of their driving motor 12. However, when set in motion the speed of the shaft 14 and that of the pinch rolls 11 is varied in accordance with the speed and direction at which the yoke motor is driven. Consequently, by varying the speed of such motor and by controlling the period and direction of its operation, once the stock is engaged by such rolls, the entrance of the stock into the shear may be regulated.

In the present embodiment of the invention the strip is fed to the pinch rolls 11 directly from the rolling mill 7, and as the speed of such mills is usually substantially constant, it is impossible to increase the speed of the strip to bring its leading end into step with the cutting blades of the shear and in such a combination the yoke motor 23 must be adapted to operate in one direction only, and that to retard the speed of the pinch rolls. The slowing up of the pinch rolls will, of course, produce a loop in the strip between them and the mill, as shown by the dotted lines in Fig. 2, but this will in no way interfere with the operation of the mill or the shearing apparatus.

In order to automatically control the operation of the yoke motor 23, so that each piece of stock will be automatically properly adjusted for the first cut, although fed at random from the mill, a flag switch 27 is arranged between the pinch rolls and the shear to be engaged by the strip as it leaves the mill. Associated with such flag is a contact 28 which is connected by a conductor 20 with one side of a source of current supply $L_1$, and $L_2$, and adapted to be engaged by the flag when it in turn is engaged by the strip. A pair of back contacts 29 is also associated with the flag and adapted to be closed by it to complete a circuit, which will presently be described, when it is in its normal position of rest or out of engagement with the strip. From the bridging or actuating element 31 of the flag a conductor 32 is connected to a contact arm 33 of a multiple circuit controlling rotary switch 30 which, as shown here, is mounted on an extension 34 provided on one of the shafts on which the rotating blades of the shear are mounted. Cooperating with this contact arm which is keyed to the shear-shaft extension 34 for rotation therewith is a stationary disk or switch panel 35 on which a plurality of uniformly spaced contact points $a$, $b$, $c$ and $d$ are mounted, they being adapted to make contact with the rotary arm 33 when the latter is rotated by the shear.

The purpose of the rotary switch 30, which obviously may take other forms, is to provide for starting the yoke motor 23 in timed relation with respect to the position of the cutting blades. The actual starting of the latter motor, however, is effected by a plurality of latch switches 36, 37, 38 and 39 which are in turn controlled by the rotary switch 30. To simplify this description the parts of these different switches are distinguished from each other by the use of the letters associated with the contacts on the rotary switch to which they are connected. As shown, they each comprise a lever 41 which is pivotally mounted at its upper end and provided near its lower with a bridging member 42 for making and breaking the hereinafter described circuits. For normally holding this bridging member in a given or inoperative position, a pivotally mounted latch member 43 is provided and arranged to releasably engage the lower end of lever 41, being normally urged into engagement therewith by a spring 45. For releasing such latch an electromagnet 46 is disposed below it, and for resetting the lever after the latch is released a cam 47 provided with a knob 48 is arranged adjacent the lever 41 and adapted to engage and return the lever to its latched or inoperative position when the cam is rotated, a spring 49 being provided to actuate the lever to its operative position when it is released. The actuating coil 51 of the electromagnet 46 associated with each of these latch-controlled switches is connected by a conductor 52 to one of the contact points $a$, $b$, $c$ or $d$, respectively, of the shear-actuated rotary switch 30 and by a conductor 53 to the opposite side $L_1$ of the source of current supply $L_2$ to that connected to the main contact 28 of the flag switch 27.

For operating the cams 47a, 47b, 47c, and 47d of the latch switches they are all mounted on a common shaft 54 which is coupled through a magnetic clutch 55 with a stub shaft 56 that in turn is coupled by a pair of gears 57 and 58 with the drive shaft of the yoke motor 23. Hence when the clutch 55 is engaged, these cams are rotated by and in synchronism with the yoke motor. To return the cams to a definite starting position, so that for each operation they will start from the same relative position, for a purpose which will presently appear, a spring device 59 or other suitable means is mounted on the end of shaft 54 opposite to that to which the clutch 55 is connected. Devices of this character are deemed so well known as to require no further description.

For starting the yoke motor 23 and engaging the clutch 55 whenever one of the latch switches is released, a pair of contacts 61 is arranged to be closed by the bridging member 42 when the latch 43 is released and the lever 41 is forced to its operative position by spring 49. These contacts on the different switches are in turn connected in parallel circuit relation with each other by conductors 62 and in series circuit relation with the actuating coils of the clutch 55 and the binding posts of the yoke motor 23 through conductors 63 and 64 to a source of current supply represented by line conductors X and Y. Consequently, when the end of a piece of stock strikes the flag 27 and the bridging element 31 is moved into engagement with the contact 28, the rotary arm 33 of the rotary switch 30 is energized. Thereafter, as soon as one of the contacts $a$, $b$, $c$, or $d$ is energized, a circuit through one of the actuating coils 51 of the electromagnets 46 is completed. For example, if the flag 27 is operated at the instant the rotary arm 33 is in the position shown in Fig. 2, a circuit is completed which extends from conductor $L_2$ through contact 28, bridging arm 31, conductor 32, the rotary arm 33 of switch 30, contact point $b$, conductor 52b, the magnetic coil 51b and conductor 53b to line conductor $L_1$. The actuating coil 51b when energized attracts the latch 43b to the electromagnet 46b and releases the lever 41b, the circuit being established for only an instant, being broken when arm 33 leaves the contact $b$.

As soon as the lever 41b is released, the spring 49b forces the bridging member 42b into contact with the contact points 61b. This completes a circuit from line conductor X through conductors 62b, conductor 63, magnetic clutch 55 and the motor 23 by way of conductor 64 to line conductor Y, which energizes the clutch 55 connecting the shaft 54 on which the cams 47 are mounted to the motor 23, and at the same time energizes the motor 23, setting the yoke 19 of the differential 13 in motion. This causes the speed of the pinch rolls to be retarded until the knob 48b on cam 47b engages the lever 41b and returns it to its latched or inoperative position, which it does when the stock has been retarded an amount equal to the distance the cutting blades move from the time the arm 33 engages the contact b until they move into cutting opposition with each other. When this occurs, the lever 41b is relatched, the circuit through the conductor 67b is broken, the yoke motor stopped and the clutch 55 disengaged. When the latter is disengaged, the reset spring element 59 on the shaft 54 returns the cams 57 to their original starting position in readiness for a new cycle of operation.

During the period when the motor 23 is in operation it retards the rotation of the pinch rolls 11 as set forth above. To bring the end of the strip in step with the shear blades it is operated at such a speed with respect to the speed of motor 12 that it so retards the pinch rolls that they pass an amount of stock through them during such period which is less than the normal amount, an amount equal to that which normally passes through the shear while the arm 33 is moving from contact b to a point coinciding with the cutting position of the shear blades. To simplify the control for this purpose, flag 27 is spaced from the shear a distance equal to some multiple of the length of the cuts to be produced and to not interfere with the regular cuts, the distance is made sufficiently far enough away so that the motor 23 will have time to completely perform its duty and be out of service before the stock reaches the shear.

To prevent more than one of the latch switches being operated each time a piece of stock is fed into the shear, a pair of contacts 65 is mounted on the latch switches to be engaged by the bridging members 42 when the lever 41 is in its inoperative or latched position. These contacts on the different latch switches are connected in series circuit relation with each other by a conductor 66 which is extended from line conductor L1 through the actuating coil 67a of a magnetic switch or contactor 67 and the contact points 29 of the flag 27 to the line conductor L2. On this magnetic switch 67 there is provided a bridging member 67b which is connected in the conductor 20 and adapted to open that conductor when the contactor 67 is deenergized. To prevent it falling open after the flag switch 27 is engaged by the strip, and before a circuit is established through the rotary switch 30, a bridging member 67c is provided on contactor 67 and connected in a holding circuit 68 which is adapted to short circuit the contact members 29 of switch 27 as long as the contactor 67 is closed. Accordingly, when the bridging member 67c is closed, contactor 67 will be maintained closed once it is energized until one of the latch switches is released to break the circuit through the conductor 66. However, once conductor 66 is broken by the closing of switch 27 and the opening of one of the sets of contacts 65a, 65b, 65c or 65d, contactor 67 can not be reclosed until after the strip passes out engagement with the flag 27 and permits it to return to its open or position of rest, closing the contacts 29.

In accordance with the above, it will be appreciated that the length of the first cut will always be equal to the amount of material passing the flag 27 before the arm 33 of switch 30 contacts one of the contact points a, b, c or d after the flag is engaged by the stock, and obviously the number of these and the number of latch switch may be varied to vary the length of the cut, but preferably a number thereof is employed which is equal to the longest length of cut which the shear is intended to produce divided by the desired length of crop. Hence the crop cut will never exceed the length desired. The length, of course, may be varied if desired by merely shifting the position of the flag switch which is preferably adjustably mounted for such purpose.

In operation, with the shear running at a given speed, and the pinch rolls 11 likewise driven at a speed corresponding therewith, as soon as the front end of the stock engages the flag 27 the contact arm 33 of the switch 30 is energized. Thereafter as soon as it contacts one of the contact points a, b, c, or d, one of the coils 51 of the electromagnets 46 is energized, and one of the latch switches 36, 37, 38 or 39 associated therewith is released, depending upon which one of the contacts a, b, c or d the contact arm 33 engages first. This pulls the latch 43 operated thereby out of engagement with the lever 41, and causes the circuit through the magnetic clutch 55 and the yoke motor 23 to be closed, setting the yoke motor in operation and engaging the clutch 55. With the starting of the yoke motor the cam shaft 54 is started, carrying the cams 47 with it. Thereafter as soon as the knob 48 on the cam 47 associated with the released latch switch engages the lever 41 of such switch it breaks the circuit to the yoke motor. During this period the yoke motor operates the planetary section of the differential 13 in a direction to retard the pinch rolls 11 and at such a speed that it retards these rolls sufficiently to bring the leading end of the strip into step with the cutting blades of the shear. At the instant the yoke motor 23 is stopped the pinch rolls return to their normal speed, the clutch 55 is released, and the cams 47 are returned to their initial position by the spring element 59, in readiness for another operation. Such subsequent operation, however, can not take place until the strip passes out of engagement with the flag and the flag is engaged by a new piece of stock because the holding circuit for the switch 67 is broken when one of the latch switches is opened and can not be reestablished until the flag switch closes its back contacts 29 which it does only when not engaged by a piece of strip.

According to the provisions of the patent statutes, I have explained the principle and mode of operation of my invention, and have illustrated and described what I now consider to be its best embodiment. However, I desire to have it understood that, within the scope of the appended claims, the invention may be practiced otherwise than as specifically illustrated and described.

1. In combination a flying shear equipped with cooperating cutting blades, a motor connected to continuously drive said shear at a uniform speed, means spaced from the shear for feeding stock thereinto, means for normally driving said feeding means in synchronism with said shear, means for varying the speed of said stock feeding means, means driven in timed relation with said shear blades for starting said feed varying means, a switch disposed in the path of the stock for energizing said starting means, means connecting said stock-operated switch to said starting means, and means operated by said feed speed varying means for stopping the latter, said stopping means being adapted to operate in timed relation with said shear driven means.

2. In combination a flying shear equipped with cooperating cutting blades, a motor connected to continuously drive said shear at a uniform speed, means spaced from the shear for feeding stock to be severed thereinto, a motor coupled to said feeding means and adapted to normally drive said means in synchronism with said shear, means for altering the speed of said feeding means a definite amount, means driven continuously by said shear for setting said feed speed altering means in operation, means arranged to be responsive to the stock for energizing said last-mentioned shear driven means, and means driven by said speed altering means for stopping it.

3. In combination a flying shear equipped with cooperating cutting blades, a motor connected to continuously drive said shear at a uniform speed, means spaced from said shear for feeding stock to be severed thereinto, means for normally driving said stock feeding means in synchronism with the shear, means for varying the speed of said stock feeding means to vary the entrance of the stock into the shear with respect to its cutting blades, a control means arranged to be operated by the stock as it approaches the shear, an intermittently operable control device electrically connected to said control means and mechanically connected to said shear for indicating with substantial accuracy the position of said shear blades when said control means is operated, and means responsive to said control device and said feed varying means for starting and stopping said feed varying means.

4. In combination a flying shear, a motor connected to continuously drive said shear at a uniform speed, a pair of pinch rolls spaced from the shear for feeding stock to be severed thereinto, a motor for normally driving said pinch rolls in synchronism with said shear, a differential gear unit mounted between said synchronous motor and said pinch rolls, a constant speed motor coupled to said differential for varying the speed of said pinch rolls without altering the speed of said pinch roll motor, an adjustably mounted switch arranged at a preselected distance in front of said shear to be operated by the stock as it is fed into the shear, control means set in operation by said stock-operated switch for controlling the operation of the motor connected to said differential whereby to control the length of the first cut, said control means comprising a multiple contact switch operably coupled to said shear and electrically connected to said stock-operated switch, a plurality of switches connected to the contacts of said multiple contact switch, means for completing a circuit through said stock-operated switch, the first contact of said multiple contact switch closed after said stock-operated switch is closed and the one of said plurality of switches connected to the said contact on the multiple contact switch, means responsive to whichever one of said plurality of switches is energized for starting said differential motor, and means operated by said differential motor for opening whichever of said multiple of switches is closed to start said differential motor after said last-mentioned motor is operated a preselected length of time, said switch opening means being designed to operate in angularly timed relation with said shear-operated multiple contact switch.

5. In combination a flying shear equipped with cooperating cutting blades, a motor connected to continuously drive said shear at a uniform speed, a pair of pinch rolls spaced from the shear for feeding stock to be severed thereinto, a motor coupled to said pinch rolls for normally driving them at a uniform speed, means for maintaining the speed of said pinch roll motor in synchronism with the shear, a differential gear unit consisting of sun gears, intermediary planetary gears and supporting means therefor mounted in the connection between said synchronous motor and said pinch rolls, a constant speed motor operably coupled to said support in which the planetary gears are mounted for varying the speed of said pinch rolls without altering the speed of the pinch roll motor, an adjustably mounted flag switch arranged at a preselected distance in front of said shear to be engaged by the stock as it is fed into the shear, a multiple contact switch operably coupled to said shear and electrically connected to said flag switch for indicating the position of the shear blades when said flag is operated, a plurality of switches for controlling the operation of said planetary gear motor, means for normally holding said last-mentioned switches in a selected inoperative position, means controlled by said multiple contact switch for releasing said plurality of switches to start said planetary motor, means for returning said plurality of switches to their locked position after a definite period of operation, means releasably connected to said planetary motor for operating said switch locking means, and means also controlled by said latch switches for preventing more than one of them being operated each time a piece of stock is passed through the shear.

6. In combination a flying shear equipped with cooperating cutting blades, a motor connected to continuously drive said shear at a uniform speed, a speed change unit disposed between said shear and said driving motor for changing the speed of the shear, a pair of pinch rolls spaced from the shear for feeding stock to be severed thereinto, a synchronous motor coupled to said pinch rolls for normally driving them at a uniform speed, an alternating current generator operably coupled to said shear motor and electrically connected to said synchronous motor to insure said pinch roll motor operation in synchronism with the shear, a differential gear unit consisting of oppositely disposed sun gears and intermediary planetary gears mounted in the connection between said synchronous motor and said pinch rolls with said planetary gears supported in a movable frame, a constant speed motor operably coupled to said planetary gear support for rotating it to vary the speed of said pinch rolls without altering the speed of said synchronous motor, an adjustably mounted flag switch arranged at a preselected distance in front of said shear to be engaged by the stock as it is fed into the shear, a multiple contact switch operably coupled to said shear and electrically connected to said flag switch for indicating the position of the shear blades when said flag is engaged by the leading end of each piece of stock, a plurality of switches for controlling the operation of said planetary motor, a latch member for normally holding each of said last-mentioned switches in a selected inoperative position, an electro-magnet associated with each of said latches for releasing them, said magnets being each connected to a separate contact provided on said multiple contact switch, a cam associated with each of said latch switches for returning them to their latched positions after they are unlatched, a shaft on which said cams are mounted, a clutch for releasably connecting said shaft to the motor connected to said planetary gear support, means for returning said cam shaft to a selected position of rest each time said clutch is released, means operated by said latch switches for controlling said clutch and said planetary gear motor, and means also controlled by said latch switches for preventing more than one of them being operated each time a piece of stock is passed through the shear, the cams being so designed to stop said planetary motor when the end of each piece of stock is varied the amount required to place it in step with the cutting blades of the shear as determined by said rotary and flag switches.

7. In combination a flying shear equipped with cooperating cutting blades, means for driving said shear at a uniform speed, means for normally feeding a piece of stock to be severed into said shear at a uniform speed and means for varying the speed of said feeding means to control the entrance of the stock into the shear so as to determine the length of the first cut, said means comprising a flag switch arranged in the path of the stock in front of the shear, a multiple contact switch arranged to be driven in synchronism with the shear for measuring the extent to which the stock is out of step with the cutting blades thereof when it engages said flag switch, means responsive to said latter switch for initiating the operation of the feed varying means, and means operated by said feed varying means for discontinuing its operation when the cutting blades are brought into step with the end of the stock.

8. In combination, a flying shear equipped with cooperating cutting blades, means for driving said shear at a uniform speed, means spaced from the shear for feeding stock into it, means for varying the speed of said stock feeding means, control means driven in timed relation with said shear for setting said speed-varying means in operation, means operated by the stock for energizing said control means to render it operative, and means operated by said speed-varying means for stopping itself.

9. In combination, a flying shear equipped with cooperating cutting blades, means for feeding stock thereinto, means for varying the speed of said feeding means to control the length of the first cut made on a piece of stock fed at random to the shear, means driven in timed relation with the shear for indicating the position of its cutting blades at different points in their cycle of movement, means disposed in the path of the stock to be actuated by the front end of the stock, means energized by said stock-operated switch for utilizing said shear driven knife-indicating means to set said speed-varying means in operation and a plurality of switches driven by said speed-varying means and controlled by said shear-driven means for stopping said speed-varying means each time it is operated.

FLORENCE C. BIGGERT, Jr.